United States Patent [19]

Bartimus

[11] Patent Number: 5,720,113
[45] Date of Patent: Feb. 24, 1998

[54] APPARATUS DESIGNED FOR USE AS BOTH A STRING LINE ANCHORING DEVICE AND AS A PLUMB BOB

[76] Inventor: Christopher Shawn Bartimus, 75-5851 Kuakini Hwy., Kailua-Kona, Hi. 96740

[21] Appl. No.: 643,417

[22] Filed: May 8, 1996

[51] Int. Cl.⁶ .................. G01C 15/10; B43L 7/00
[52] U.S. Cl. .................. 33/413; 33/392; 33/332
[58] Field of Search .................. 33/413, 392, 393, 33/394, 409, 414, 332, 666

[56] References Cited

U.S. PATENT DOCUMENTS

| | | | |
|---|---|---|---|
| 1,098,033 | 5/1914 | Friendship | 33/413 |
| 2,446,253 | 8/1948 | Tresidder | 33/409 |
| 2,594,823 | 4/1952 | Suverkrop | 33/392 |
| 3,113,387 | 12/1963 | Bean, Jr. | 33/392 |
| 5,157,843 | 10/1992 | Barcewski | 33/392 |

*Primary Examiner*—Christopher W. Fulton
*Attorney, Agent, or Firm*—Angus C. Fox, III

[57] ABSTRACT

A tool is disclosed which incorporates both a stick-pin peg and an eyelet-shaped hook, either of which may be used to anchor a chalk line. The tool can also double as a plumb bob. The tool has a peg-shaped body with a longitudinal axis. The body has a tapered lower end which terminates in a sharpened stick pin. The body has a recess for holding the eyelet-shaped hook and also incorporates a clamping mechanism which both releaseably secures the hook within the recess, and eliminates any need for tying and untying the string to the tool. The string remains secured to the eyelet-shaped hook. In order to secure the line with the eyelet-shaped hook, the hook is removed from the body by releasing the clamping mechanism. In order to secure the line with the stick-pin peg, the eyelet-shaped hook is secured within the body recess and the string is secured to the needle point by looping the string over itself twice. In order to utilize the anchor/bob as a plumb bob, the body is suspended from its longitudinal axis.

5 Claims, 3 Drawing Sheets

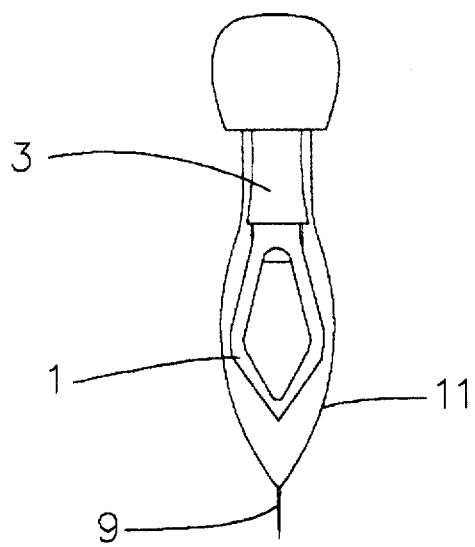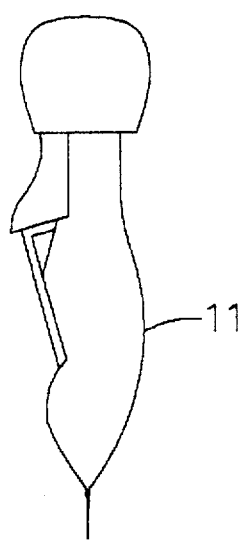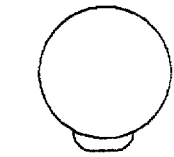
Fig. 1    Fig. 2    Fig. 3
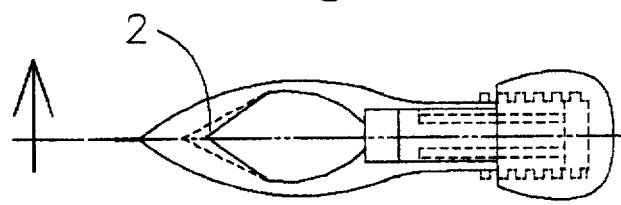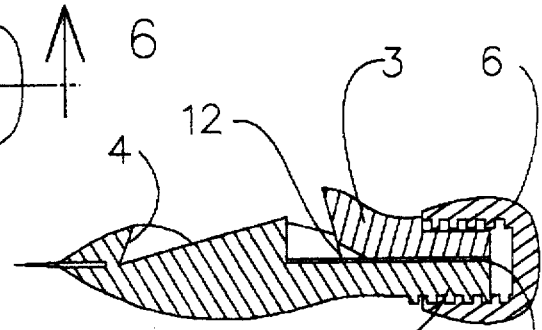
Fig. 4    Fig. 6
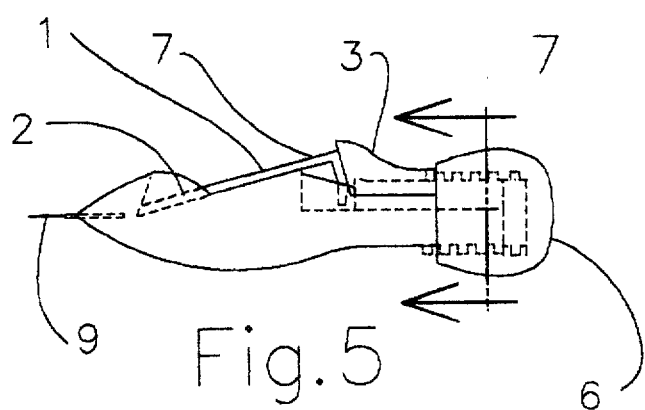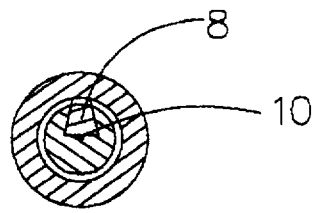
Fig. 5    Fig. 7

APPARATUS DESIGNED FOR USE AS BOTH A STRING LINE ANCHORING DEVICE AND AS A PLUMB BOB

BACKGROUND OF THE INVENTION

1. Field of the Invention

This invention relates to carpentry and construction tools and, more specifically, to string anchoring devices and plumb bobs.

2. Description of Related Art

Various techniques are used to secure the free end of an alignment string or construction chalk line. One commonly utilized technique is that of having an assistant hold the free string end while the journeyman sights down or snaps the string. Another technique is that of securing the free end of the of string or line to a hand-driven nail. There is also a peg-like stick pin anchor, which looks much like a hand-thrown dart minus its tail feathers. That is to say that is generally a finger size peg having a needle fixed into one end thereof. A string line is generally tied around an annular ring near the base of the anchor and looped around the needle point. The anchor can be pushed into soft material by hand. However, neither the nail nor the stick pin anchor is of any value to a worker constructing with metal. Another technique employs a traditional eyelet-shaped hook which is designed to anchor on the edge of right-angled materials. Such a device, though, is of little use to a worker who desires to anchor a string end to a flat surface.

SUMMARY OF THE INVENTION

The present invention is a compact and versatile tool which incorporates both a stick-pin peg and an eyelet-shaped hook, and which can also double as a plumb bob. The device (hereinafter referred to as the "string anchor/plumb bob" or, merely, "anchor/bob") incorporates a clamping mechanism which both secures the hook to the peg body and eliminates any need for tying and untying the string to the device.

The string anchor/plumb bob has a peg-shaped main body having upper and lower ends. The lower end, which tapers to a point, incorporates a durable, sharpened point which can be pressed into soft material, such as wood. In a preferred embodiment, the clamping mechanism is composed of an internally threaded cap, a moveable clamping jaw, and a stationary clamping jaw. The cap is threadably secured to the upper end of the body, which is externally threaded. The body includes a recess shaped to receive the eyelet-shaped hook. The stationary clamping jaw forms the lower end of the recess. The body also includes a longitudinal, dove-tailed slot that is shaped to receive the moveable clamping jaw. The base of the slot has a groove that coincides with the longitudinal axis of the body. The cap bears on the moveable jaw, which is slidably inserted in the dove-tailed slot. When the eyelet-shaped hook is placed in the body recess, the cap may be tightened to bear against the moveable jaw, which wedges the eyelet-shaped hook against the stationary clamping jaw. A snap line (i.e., length of string) is secured to the eyelet-shaped hook. In order to secure the line with the eyelet-shaped hook, the hook is removed from the body by unscrewing the cap. In order to secure the line with the stick-in peg, the eyelet-shaped hook is secured within the body recess and the string is secured to the needle point by looping the string over itself twice. In order to utilize the anchor/bob as a plumb bob, the cap is removed and the string is positioned within the groove. The movable jaw retains the string in the groove. Alternatively, the cap is cut through to the center so that it may be affixed to the upper end of the body and still allow the string to pass through its center.

BRIEF DESCRIPTION OF THE DRAWINGS

FIG. 1 is a front elevational view of the anchor/bob;

FIG. 2 is a side elevational view of the anchor/bob;

FIG. 3 is a top plan view of the anchor/bob;

FIG. 4 is a front, see-through view of the anchor/bob with the eyelet-shaped hook removed;

FIG. 5 is a side, see-through view of the anchor/bob with the eyelet-shaped hook installed in the recess;

FIG. 6 is a side, cross-sectional view of the anchor/bob with the eyelet-shaped hook removed;

FIG. 7 is a top, cross-sectional view of the anchor/bob;

PREFERRED EMBODIMENT OF THE INVENTION

Figure 8:
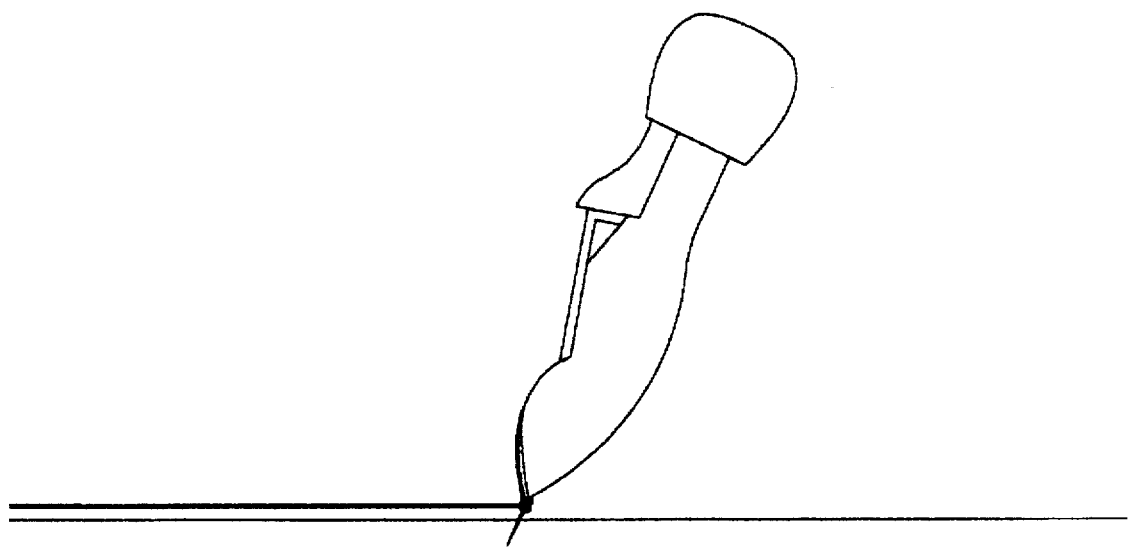
FIG. 8 is a side elevational view of the anchor/bob, with the sharpened point embedded in a soft surface and with the string wrapped around the point.

The present invention is a compact tool for anchoring chalk lines, alignment strings, or the like and which is also readily adaptable to function as a plumb bob.

Referring now to FIG. 1, the string anchor/plumb bob tool comprises a peg shaped body having a tapered lower end and a threaded upper end 11, a threaded cap 6 which can be threadably engaged with the upper end 11, a sharpened point 9 affixed to the tapered lower end, a slidable upper jaw 3, a lower fixed clamping jaw 4, and an eyelet-shaped hook clampable between the upper jaw and the lower jaw by tightening the cap 6 against the upper jaw.

Referring now to the side view of FIG. 2, the clamping of the eyelet-shaped hook i between the upper jaw and the lower jaw is more clearly illustrated.

Referring now to top plan view of FIG. 3, only the top of cap 6 and a portion of the slidable upper jaw 3 are visible.

Referring now to the front view of FIG. 4, the string anchor/plumb bob is shown with the eyelet-shaped hook 1 removed from its mounting recess 2, which incorporates a fixed lower clamping jaw 4.

Referring now to FIGS. 5, 6 and 7, the functionality of the device is readily apparent. The body 11 incorporates a longitudinal, dove-tailed slot 8 (best observed in the cross sectional view of FIG. 7) that is shaped to receive the moveable clamping jaw 3. The base of the slot has a groove 10 (best observed in FIG. 7) that coincides with the longitudinal axis of the body. The threaded cap, as it is threadably tightened on the threaded upper end of the body 11, bears on the moveable upper jaw 3, which is slidably inserted in the dove-tailed slot. When the eyelet-shaped hook 1 is placed in the body recess 2, the cap may be tightened to bear against the moveable jaw 3, which wedges the eyelet-shaped hook 1 against the fixed clamping jaw 4. A snap line (i.e., length of string) is secured to the eyelet-shaped hook 1. In order to secure the line to a work piece having a right-angled edge with the eyelet-shaped hook, the hook is removed from the body by unscrewing the cap 6.

Referring now to FIG. 8, in order to secure the line with the stick-in peg, the eyelet-shaped hook is secured within the body recess and the string 11 is secured to the needle point by looping the string 11 over itself twice.

Figure 9:
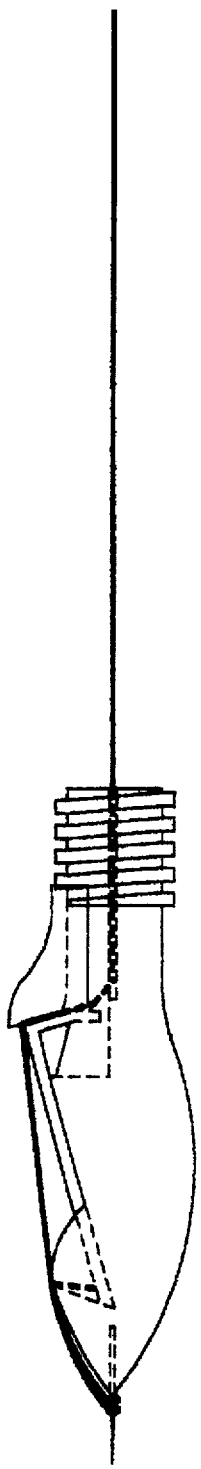
FIG. 9 is a side, see-through view of the anchor/bob with the cap removed and adapted to serve as a plumb bob.

Referring now to FIG. 9, in order to utilize the anchor/bob as a plumb bob, the cap 6 is removed and the string 11 is positioned within the groove. The movable jaw 3 retains the string in the groove 10. Alternatively, the cap 6 may be equipped with a slot cut through to the center so that the cap 6 may be affixed to the threaded upper end of the body and still allow the string to pass through its center.

Although only a single embodiment of the string line anchoring device is disclosed herein, it will be obvious to those having ordinary skill in the art of integrated circuit manufacture, that changes and modifications may be made thereto without departing from the scope and the spirit of the invention as hereinafter claimed.

I claim:

1. A string line anchoring device comprising:
   an eyelet anchor to which a string line may be attached, said anchor having a V-shaped end portion;
   a peg-shaped main body having a sharpened, pointed lower end, said main body also having a recess formed therein, said main body also having a V-shaped stationary clamping jaw positioned at a first end of said recess;
   a movable clamping jaw slidably affixed to said main body at a second end of said recess, said anchor being securable within said recess by pressure exerted thereupon by said damping jaws, the V-shaped clamping jaw engaging the V-shaped end portion, and thereby providing a centering action as the anchor is secured within said recess.

2. The string line anchoring device of claim 1, which is adaptable to function as a plumb bob when suspended by said string line axially to said sharpened pointed lower end.

3. A string line anchoring device comprising:
   a peg-shaped main body having a threaded upper end and a sharpened, pointed lower end, said main body also having a recess formed therein, said main body also having a stationary_ clamping jaw positioned at a lower end of said recess and a dovetailed slot at an upper end of said recess;
   a movable damping jaw slidably inserted within said slot;
   an eyelet anchor to which a string line may be attached; and
   a threaded cap which may be threadably engaged with said upper threaded end to bear against said movable jaw, said eyelet hook being securable within said recess between said fixed clamping jaw and said movable clamping jaw by the bearing action of said cap against said movable jaw.

4. A combination plumb bob/string line anchoring device comprising:
   an eyelet anchor to which a string line may be attached;
   a peg-shaped main body having a threaded upper end, and a sharpened, pointed lower end, said main body also having a recess in which said eyelet anchor may be releasably secured;
   a threaded cap which may be threadably engaged with said upper threaded end to secure said eyelet anchor within said recess; and
   wherein said device is adaptable to function as a plumb bob when suspended by said string line axially to said sharpened pointed lower end.

5. The combination plumb bob/string line anchoring device of claim 4, wherein said main body incorporates a lower clamping jaw at a lower end of said recess, and a dovetailed slot at an upper end of said recess, and said device further comprises a movable clamping jaw slidably inserted within said slot, and said eyelet hook is securable within said recess between said fixed clamping jaw and said movable clamping jaw by the beating action of said cap against said movable jaw.

* * * * *